US00RE34104E

United States Patent [19]

Takahashi et al.

[11] E Patent Number: Re. 34,104

[45] Reissued Date of Patent: Oct. 20, 1992

[54] HOT WIRE AIR FLOW METER

[75] Inventors: Minoru Takahashi, Mito; Hiroastu Tokuda, Katsuta; Izumi Watanabe, Katsuta; Yutaka Nishimura, Katsuta, all of Japan

[73] Assignees: Hitachi, Ltd., Tokyo; Hitachi Automotive Engineering Co., Ltd., Katsuta, both of Japan

[21] Appl. No.: 620,736

[22] Filed: Dec. 3, 1990

Related U.S. Patent Documents

Reissue of:

[64] Patent No.: 4,881,407
Issued: Nov. 21, 1989
Appl. No.: 105,809
Filed: Oct. 8, 1987

[30] Foreign Application Priority Data

Oct. 8, 1986 [JP] Japan ..... 61-239940
Oct. 8, 1986 [JP] Japan ..... 61-239941

[51] Int. Cl.[5] ..... G01F 1/68

[52] U.S. Cl. ..... 73/204.15; 73/204.25

[58] Field of Search ..... 73/204.16, 204.15, 204.25, 73/204.26, 204.27; 338/25, 296

[56] References Cited

U.S. PATENT DOCUMENTS 4,361,597 11/1982 Arima ..... 338/25
4,559,814 12/1985 Sato et al. ..... 73/204.27
4,561,303 12/1985 McCarthy ..... 73/204.24

FOREIGN PATENT DOCUMENTS 58-952265 6/1983 Japan .

*Primary Examiner*—Herbert Goldstein
*Attorney, Agent, or Firm*—Antonelli, Terry, Stout & Kraus

[57] ABSTRACT

The bobbin (21) of the heating resistor (1) is made by zirconia or glass fiber. On the surface of the bobbin, a platinum film (31) or a platimum wire (23) are formed. At both ends of the heating resistor, the heating resistor is supported by a pair of supporting conductors (25).

5 Claims, 4 Drawing Sheets

HOT WIRE AIR FLOW METER

Matter enclosed in heavy brackets [ ] appears in the original patent but forms no part of this reissue specification; matter printed in italics indicates the additions made by reissue.

FIELD OF THE INVENTION

The present invention relates to a hot wire air flow meter, and more particularly to a structure of a heating resistor used for the hot wire air flow meter which detects intake mass air flow of an internal combustion engine.

BACKGROUND OF THE INVENTION

FIG. 2 shows a whole sectional diagram of a conventional hot wire air flow meter. Referring to FIG. 2, a heating resistor 1 and an intake air temperature detecting resistor 2 having the same structure as the heating resister are arranged within a bypass passage 4 of a body 5 that has a main passage 3 in which a major portion of the intake air passes and the bypass passage 4 in which a portion of a divided intake air passes.

FIG. 3 shows a driving circuit 6 of the hot wire air flow meter. The driving circuit comprises the heating resistor 1, the intake air temperature detecting resistor 2, operational amplifiers 7 and 8, a power transistor 9, a condenser 10, and resistor 11–15. A corrector terminal 16 of the power transistor 9 is connected to (+) pole of a battery, an earth 17 of the resistor 1 is connected to (−) pole of the battery, and a connection point of the resistor 11 and the heating resistor 1 is connected to an input terminal 18 of a micro computer which carries out an engine control using the output signal of the hot wire air flow meter.

In such a structure, the temperature of the heating resistor 1 is controlled to be higher than that of the intake air temperature detecting resistor 2 by a constant temperature by supplying a current to the heating resistor 1. At this time, the intake air temperature detecting resistor 2 is used for compensating the temperature of the intake air in such a manner that the heating of the intake air temperature detecting resistor is neglected and the intake air temperature is able to be detected. When air blows against the heating resistor 1, the temperature difference between the heating resistor 1 and the intake air temperature detecting resistor 2 is controlled to be constant by the operation of the driving circuit 6 as explained above. The control is carried out by feedback in such a manner that a divided voltage of a voltage difference of both ends of the heating resistor 1 by the resistors 12 and 13, and a voltage, in which a voltage drop of the resistor 11 caused by the current flowing through the heating resistor 1 is amplified by the operation amplifier 8, are always equal to each other. Accordingly, when the mass air flow changes, the current flowing through the heating resistor 1 is changed so that the air flow is able to be measured by the voltage drop of the resistor 11 corresponding to the current. By inputting the measured signal of the intake mass air flow of an automobile engine to the micro computer through the terminal 18, the micro computer calculates the necessary fuel volume for maintaining an optimum combustion so that an electronic fuel injection system which is able to inject fuel by an injector can be used.

FIG. 4 shows one conventional example of the heating resistor which is used for such a hot wire air flow meter. The heating resistor has a pin 22 made of Pt-Ir (10%) inserted into respective ends of a bobbin 21 made of alumina, and a platinum wire 23 is wound thereon. Both ends of the pin 22 are supported on a supporting conductor 25 by welding 24.

In another prior art, construction as shown in FIG. 2 of Japanese Patent Laid-Open No. 58-95265, there is an example in which the resistor element is directly brazed to the supporting conductor 25, without using the pin 22.

However, these prior efforts have a draw-back in that response time of the measuring apparatus is bad, as shown by the dash line curve of FIG. 5; and when the mass air flow changes from $Q_1$ to $Q_2$ in a constant time, the value of the output voltage (V) does not rise sharply, but rises along a gentle slope curve. The draw-back causes a big problem, when the hot wire air flow meter is used for an electronic control fuel injection apparatus of an internal combustion engine, such as an automobile engine.

SUMMARY OF THE INVENTION

The object of the present invention is to provide a hot wire air flow meter having a fast response.

According to the hot wire air flow meter of the present invention, the bobbin of the heating resistor is made of zirconia ($ZrO_2$) or glass fiber. Since the heat transfer rate of zirconia or glass fiber is low, the heat generated at the heating resistor is prevented from running away through the supporting conductor so that the response thereof becomes fast.

DETAILED DESCRIPTION OF THE PREFERRED EMBODIMENTS

Figure 1:
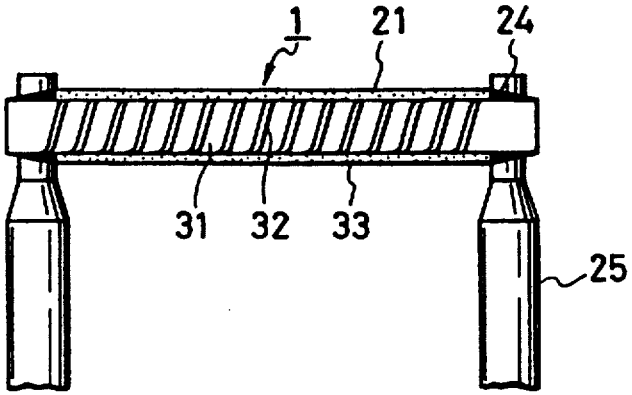
FIG. 1 shows a construction of the heating resistor of one embodiment of the present invention.
Figure 2:
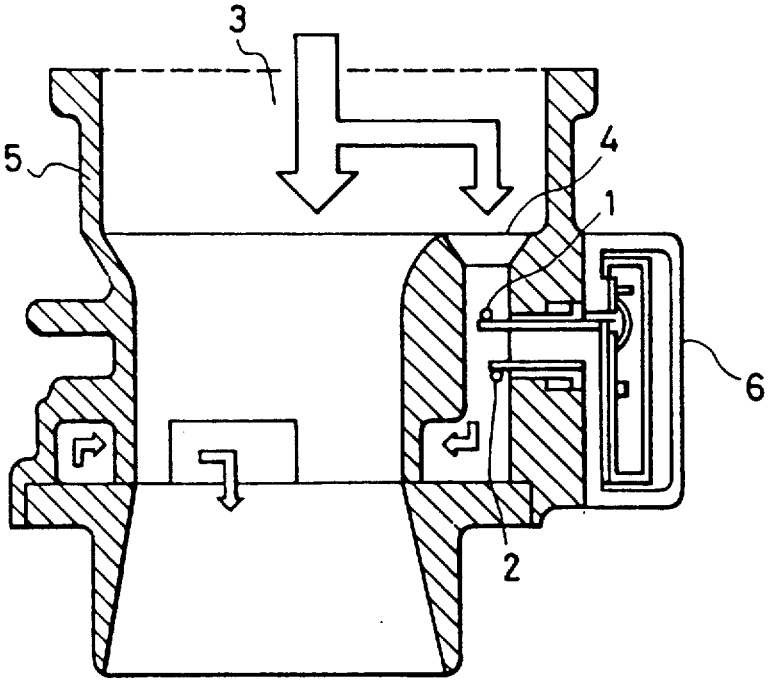
FIG. 2 PRIOR ART
FIG. 2 shows a whole sectional view of the hot wire air flow meter of a conventional prior art.
Figure 3:
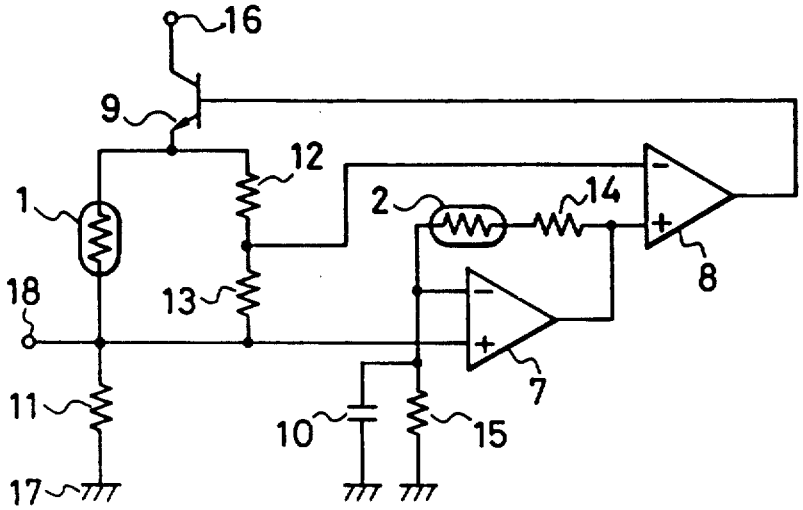
FIG. 3 PRIOR ART
FIG. 3 shows a driving circuit diagram in FIG. 2.

Referring to FIG. 1, a material of a bobbin 21 of a heating resistor 1 comprises stabilized to which is added a number mol % of $Y_2O_3$. After a platinum film 31 is deposited on the surface of the bobbin by barrel spattering, a cut 32 is formed thereon by laser trimming for adjusting the resistor value of the heating resistor. After that, a heating resistor 1 is connected to a pair of supporting conductors 25, each having a small diameter at the end portions, thereof by brazing at 24. After the heating resistor is coated by a protection glass 33 over the whole surface thereof, the heating resistor is dried at a low temperature.

Figure 5:
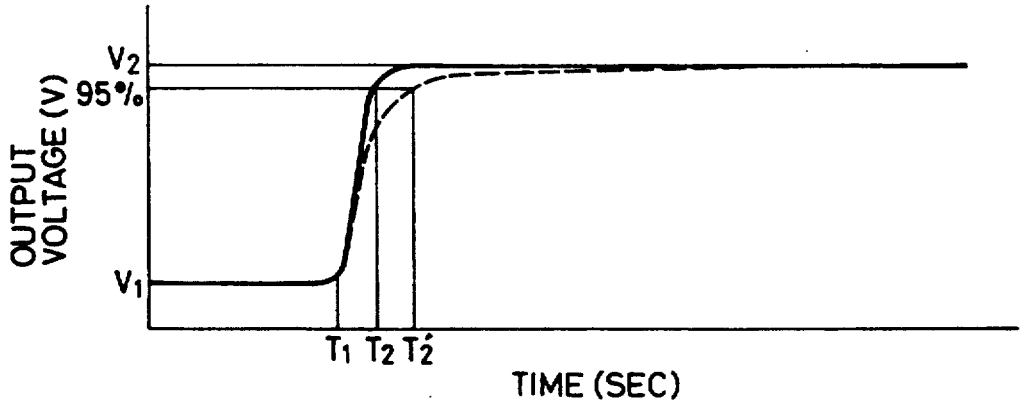
FIG. 5 shows response time characteristics of the present invention and prior art.

In FIG. 5, response time characteristic of the hot wire air flow meter using the heating resistor 1 of the present invention is shown by a solid line. Referring to FIG. 5, it can be seen that the response time of the heating resistor according to the present invention is improved. This is based on the fact that the heat quantity transmitted to the supporting conductors 25 is decreased, because the thermal conductivity of zirconia is less than $\frac{1}{3}$ compared with alumina, which is used for a main material of the heating resistor.

Since the bobbin material of the heating resistor of the present invention is stabilized zirconia, the bobbin thereof excels in flexibility compared with the hot wire air flow sensor disclosed in Japanese Patent Laid-Open No. 58-95262, which uses an alumina bobbin and, like the present invention also has the bobbin directly connected to the supporting conductor without using a pin. This is due to the fact that the present invention provides a structure which is able to absorb the thermal stress generated at measuring time, and increase the mechanical and thereby, thermal strength; and breakage of the bobbin can be prevented. Namely, the high toughness mechanism of stabilized zirconia comes from the fact that the tetragonal zirconia grain enclosed in a sintered body undergoes a martensite transformation to monocline by a concentration of stress, at the same time the breakage energy thereof is absorbed. Since both ends of the bobbin are fixed in their structure, when thermal stress is generated therein, in general, the bobbin is not broken.

Figure 4:
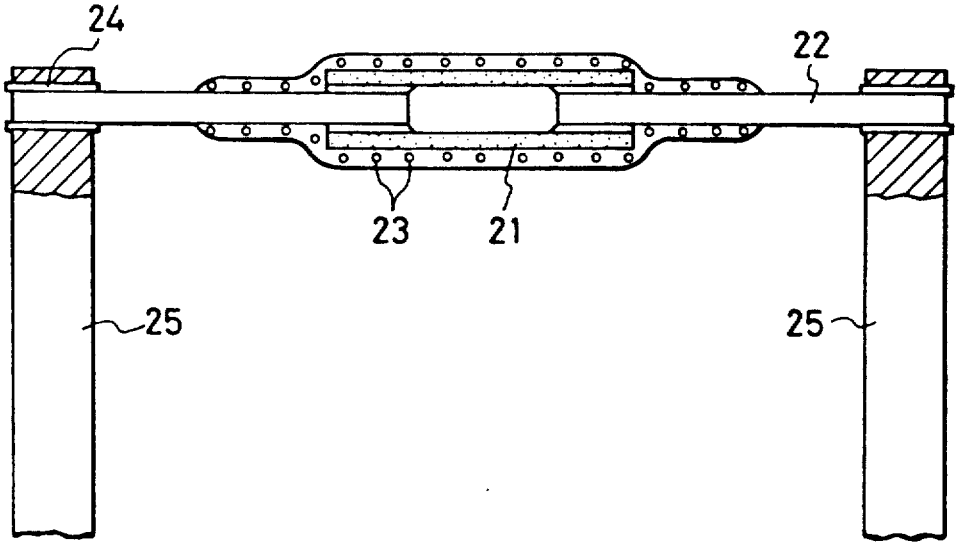
FIG. 4 PRIOR ART
FIG. 4 shows a sectional view of the heating resistor of the conventional prior art.

Since the thermal conductivity of the zirconia bobbin is small, the thermal conduction to the supporting member can be decreased; at the same time, since a pin is not used by the present invention and the bobbin length 1 can be lengthened compared with the conventional prior art arrangement shown in FIG. 4, the ratio of the bobbin length 1 to the bobbin diameter d, 1/d, is made larger so that the response thereof is increased. Namely, when the transfer of heat to and from the heating resistor 1 is considered, if the whole structure of the heating resistor 1 is made to approximately cylindrical form, the transfer of heat through air will be proportional to the surface area $\pi D1$, and the transfer of heat through the supporting conductors 25 from the both ends of the heating resistor will be proportional to the sectional area $\frac{1}{4}\pi D^2$. Since the response of a measuring apparatus becomes better when the ratio of the transfer of heat of the latter to the former is smaller, it becomes better when the value of the surface area of the former divided by that of the latter, 1/d, is larger; and further since the thermal conduction through the cross area is reduced, the response is increased.

Since the hot wire air flow meter of the present invention is made in such a manner that the bobbin is directly connected to the supporting body, it shows a remarkable improvement in performance, because it can be easily produced without the operation of inserting the pin 22 to the bobbin 21 and without different diameters between the pin 22 and the bobbin 21 compared with the prior art as shown in FIG. 4.

Figure 6:
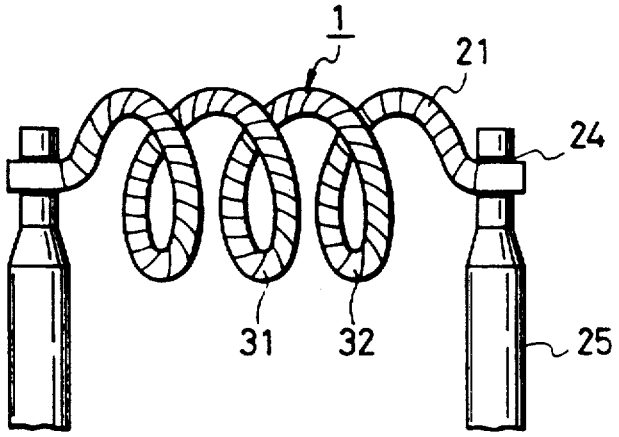
FIG. 6 shows a construction of the heating resistor of other embodiment of the present invention.

Although the embodiment shown in FIG. 1 discloses that the shape of the zirconia bobbin is straight, the heating resistor can be formed by forming the bobbin 21 a coil shape as shown in FIG. 6, since the zirconia is flexible. In this case, since 1/d can be made larger, the response can be improved, even more and since the bobbin itself has a spring function between the supporting conductor 24, the mechanical strength of the bobbin is further increased.

The bobbin is not always limited to one made with zirconia, but also the bobbin can be made with glass fiber which has a low thermal conductivity in place of zirconia.

Figure 7:
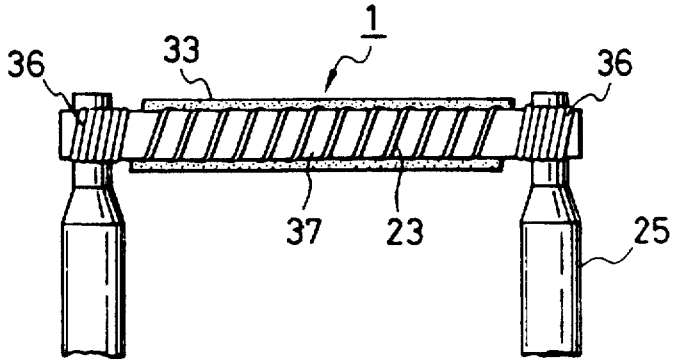
FIG. 7 shows a construction of the heating resistor of another embodiment of the present invention.

Since the hot wire air flow meter shown in FIGS. 1 and 6 uses a bobbin made of zirconia or glass fiber having small thermal conductivity, a hot wire air flow meter having a high response can be provided. Referring to FIG. 7, on a surface of a bobbin 37, a platinum wire is wound. In both ends of the bobbin, the wire is wound densely. In the closely wounded portion 36, the bobbin 37 is supported by a pair of supporting conductors 25. And, the whole bobbin 31 including the wire is covered by glass 33.

Figure 8:
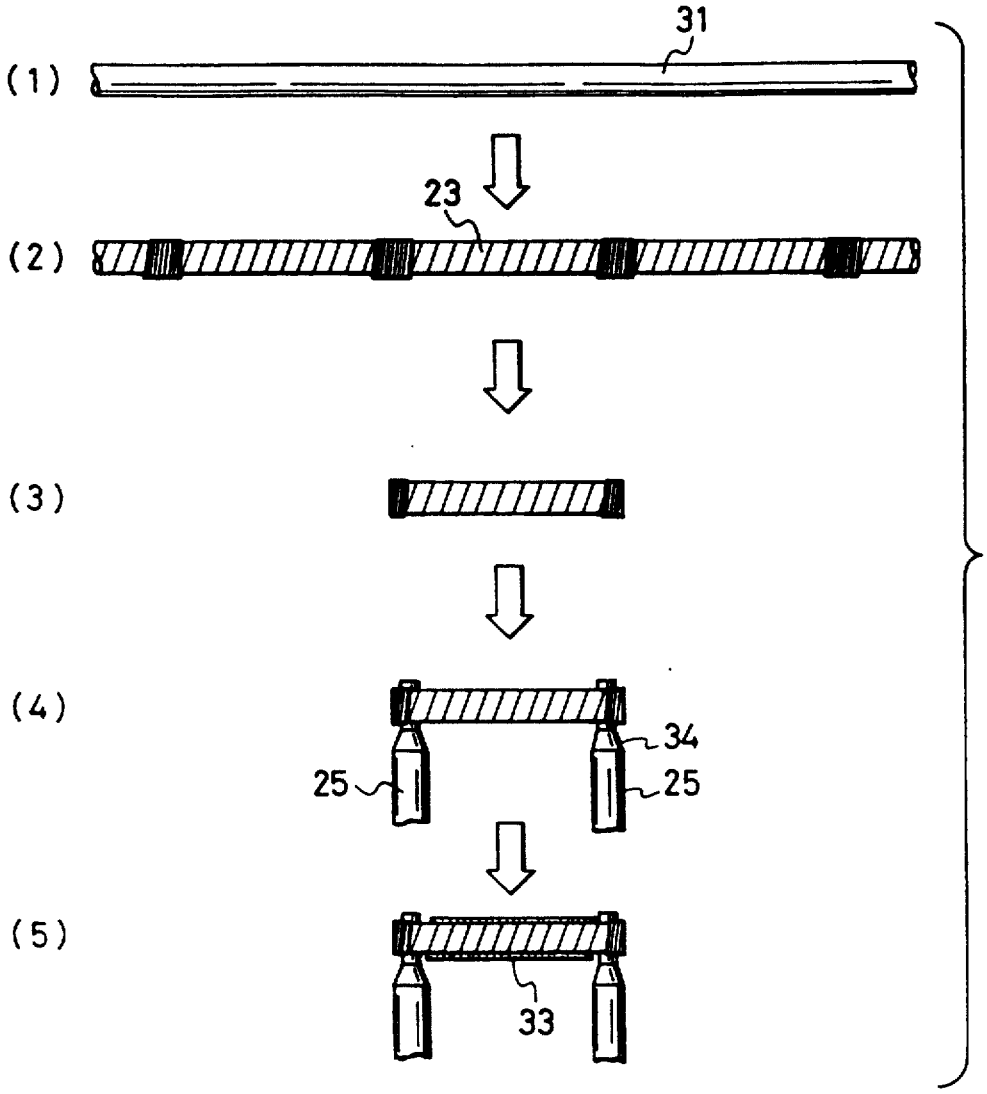
FIG. 8 shows a process diagram of the heating resistor shown in FIG. 7.

Referring to FIG. 8, the bobbin 37 made of glass fiber is wound previously to a dram (not shown), and supplied continuously. Since no supplied bobbin 37 has a portion shown in the prior art which changes its diameter along the axial direction thereof, the platinum wire 23 can be easily wound continuously. The bobbin winding is carried out with close winding and rough winding in a predetermined period in such a manner that the bobbin has a predetermined length after the bobbin is cut as explained later. After the winding is finished, the bobbin 37 is wound to another bobbin (not shown) to store the wound bobbin. Cutting of the bobbin 31 is carried out by supplying the bobbin 37 with the wire from the drum. When the cutting is carried out at the closely wound portion, a predetermined length bobbin which is wound closely at both ends thereof can be obtained as shown in FIG. 8(3). The bobbin 1 is welded to the portion 34 having a small diameter of the supporting conductor 25, and supported thereby. After that the bobbin is coated by a glass coating 33.

By the structure explained above, the heating resistor is made with a structure which has no pin (lead), so that breaking of wire and scattering of winding pitch thereof can be avoided in winding, high speed winding thereof can be done continuously, and productivity thereof can be improved.

The heating resistor shown in FIG. 7 comprises the platinum wire having a high melting point and the glass coating. Since the glass fiber bobbin has flexibility, it has heat resistance and mechanical strength.

Although the embodiment shown in FIG. 7 provides the mechanical support of the heating resistor by welding the closely wound portion of the platinum wire 23 to the supporting member 25, the closely wound portions serving at the same time, it is possible that the platinum wire 23 is wound continuously after metallic electrode plates 35 on the glass fiber bobbin are formed at both ends of the bobbin by plating, deposition, or printing. In this case, by thickening the film of the electrode plates 35, the mechanical strength of the heating resistor can be increased.

Figure 9:
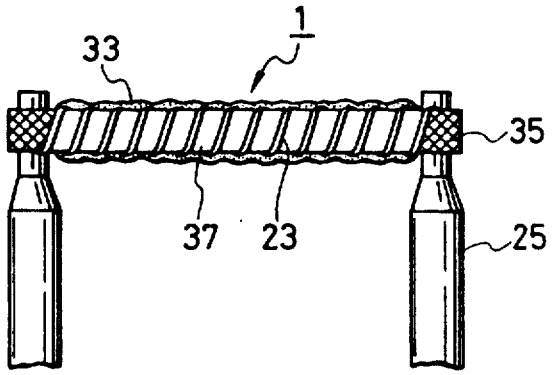
FIG. 9 shows a construction of the heating resistor of further another embodiment of the present invention.

The embodiments shown in FIG. 7 and 9 can achieve the effect of supplying a hot wire air flow meter which has mechanical strength, high thermal resistance, and is easy to manufacture. By providing the closely wound portion or the electrode surfaces, the electrical connection between the platinum wire and the supporting conductor can be performed more securely.

What we claim is:

1. For use in a hot wire air flow meter, to be arranged at an air passage for measuring an intake mass air flow for an electronic control fuel injection apparatus, having a heating resistor and a driving circuit for controlling current flowing through the heating resistor to produce an output [voltage of said heating resistor] *signal in proportion to the current* as a signal corresponding to the mass air flow, [said] *a* heating resistor comprising a platinum film deposited on a bobbin made of zirconia or glass fiber, said platinum film providing a predetermined resistance value, wherein said bobbin has the shape of a coil.

2. For use in a hot wire air flow meter having a heating resistor arranged in an air passage for measuring an intake air flow in an electronic control fuel injection apparatus, and a driving circuit for controlling current flowing through the heating resistor and for producing an output [voltage of said heating resistor] *signal in proportion to the current* as a signal corresponding to the mass air flow, [said] *a* heating resistor comprising a platinum wire wound on a surface of a bobbin made of glass fiber or zirconia with the platinum wire being wound more closely at both ends of the bobbin than over other portions thereof, and supporting conductors for supporting said bobbin at the closely wound portions thereof, wherein said bobbin has the shape of a coil.

3. For use in a hot wire air flow meter having a heating resistor arranged in an air passage for measuring an intake mass air flow in an electronic control fuel injection apparatus, and a driving circuit for controlling current flowing through the heating resistor and for producing an output [voltage of said heating resistor] *signal in proportion to the current* as a signal corresponding to the mass air flow, [said] *a* heating resistor comprising metallic electrode plates provided at both ends of a bobbin made of glass fiber or zirconia, a platinum wire wound on the surface of said bobbin, and supporting means including supporting conductors for supporting said bobbin at said electric plates.

4. A heating resistor for a hot wire air flow meter according to claim 3, characterized in that said bobbin is connected to said supporting conductors at both ends of said bobbin.

5. A heating resistor for a hot wire air flow meter according to claim 3, characterized in that said bobbin is brazed to a small diameter portion of each supporting conductor.

* * * * *